United States Patent
Loyd

(10) Patent No.: US 11,017,409 B1
(45) Date of Patent: May 25, 2021

(54) VOTING SYSTEM TO PREVENT FRAUD USING BLOCKCHAIN TECHNOLOGY

(71) Applicant: Nathaniel Loyd, Marietta, GA (US)

(72) Inventor: Nathaniel Loyd, Marietta, GA (US)

(73) Assignee: Nathaniel Loyd, Marietta, GA (US)

( * ) Notice: Subject to any disclaimer, the term of this patent is extended or adjusted under 35 U.S.C. 154(b) by 0 days.

(21) Appl. No.: 17/133,519

(22) Filed: Dec. 23, 2020

Related U.S. Application Data

(60) Provisional application No. 63/113,366, filed on Nov. 13, 2020.

(51) Int. Cl.
| | |
|---|---|
| *G06Q 30/00* | (2012.01) |
| *G07C 13/00* | (2006.01) |
| *G06K 7/14* | (2006.01) |
| *G06K 1/12* | (2006.01) |
| *H04L 9/32* | (2006.01) |
| *G06K 15/02* | (2006.01) |

(52) U.S. Cl.
CPC ......... *G06Q 30/0185* (2013.01); *G06K 1/121* (2013.01); *G06K 7/1413* (2013.01); *G06K 7/1417* (2013.01); *G07C 13/00* (2013.01); *H04L 9/3236* (2013.01); *G06K 15/021* (2013.01); *G06Q 2230/00* (2013.01)

(58) Field of Classification Search
CPC ............ G06Q 30/0185; G06Q 2230/00; H04L 9/3236; G06K 7/1413; G06K 7/1417; G06K 1/121; G06K 15/021; G07C 13/00
See application file for complete search history.

(56) References Cited

U.S. PATENT DOCUMENTS 8,297,506 B2   10/2012   Backert

FOREIGN PATENT DOCUMENTS

WO    WO-2019147295 A1 *  8/2019  ........... H04L 9/3239

OTHER PUBLICATIONS

Votem Corp, VAST Token Sale Whitepaper, 2017, 18 pages, Votem Corp, United States of America.

* cited by examiner

*Primary Examiner* — Matthew Mikels
(74) *Attorney, Agent, or Firm* — Ibrahim A. Michael Adeniji; Nakiajah Enterprises, LLC

(57) ABSTRACT

A voting system comprising at least one voting machine comprising: at least one voting machine processor. The voting machine processor performing voting machine operations comprising: initializing a vote blockchain with a vote blockchain genesis block. The vote blockchain genesis block comprising a voting machine identifier and a voting machine identifier hash value; storing the vote blockchain in at least one voting machine memory; iteratively, for a plurality of voters: receiving a signal indicating at least one vote made by a voter; creating a data structure comprising the at least one vote and a hash value of a preceding block; determining a new block hash value of the data structure; appending a new block comprising the data structure and the new block hash value to the vote blockchain; and storing the vote blockchain in the at least one voting machine memory.

20 Claims, 11 Drawing Sheets

VOTING SYSTEM TO PREVENT FRAUD USING BLOCKCHAIN TECHNOLOGY

CROSS REFERENCE TO RELATED APPLICATIONS

The present application claims the benefit of priority based on Application for Nathaniel Loyd, Application No. 63/113,366, filed on Nov. 13, 2020. The disclosure of application 63/113,366 is incorporated herein by reference in its entirety.

TECHNICAL FIELD

The present disclosure relates to vote tallying systems and methods. More specifically, the disclosed embodiments relate to systems and methods for preventing and detecting voting fraud using blockchain technology.

BACKGROUND

Ensuring citizen confidence in the reliability of elections is vital to functioning democracies. If citizens lose confidence in the validity of their elections, trust in society diminishes, governments lose consent of the governed, and societies fall into disarray and even war. Regardless of whether voter fraud is real or imagined, the mere appearance of conceivable voter fraud may be sufficient to erode citizens' trust in the democratic process.

However, modern democracies also demand anonymity in voting. Anonymity allows citizens to vote for unpopular candidates without fear of retribution, allowing freer debate and the possibility of outside candidates winning elections. Additionally, anonymity protects against the dangers of mobs by denying dangerous people access to voting histories who may harm people who did not vote in accordance with their preferred candidate. Anonymity reduces the prospect of voter intimidation, allowing minority and underrepresented groups to vote freely, and accumulate sufficient votes to represent their interests.

The desires for vote security and anonymity are in tension, though. On the one hand, possible avenues of voter fraud, such as stuffing ballot boxes, tampering with reported vote tallies, or deliberate miscounting can all be eliminated with a public record of voters and their respective choices. On the other hand, anonymous voting prevents the identification of fraudulent ballots which are impossible to separate from legitimate ballots. An intruder or fraudulent person attempting to sway an election by submitting fraudulent ballots benefits from the same anonymity that keeps citizens safe and free.

Accordingly, systems and methods are desired which ensure anonymity of legitimate voters while also providing a public and verifiable vote record, thereby increasing confidence and participation in elections.

BRIEF SUMMARY

In an embodiment of the present disclosure, a voting system comprises: at least one voting machine comprising: at least one voting machine processor; and at least one non-transitory voting machine storage medium comprising instructions that, when executed by the at least one voting machine processor, cause the at least one voting machine processor to perform voting machine operations comprising: initializing a vote blockchain with a vote blockchain genesis block, the vote blockchain genesis block comprising a voting machine identifier and a voting machine identifier hash value; storing the vote blockchain in at least one voting machine memory; iteratively, for a plurality of voters: receiving a signal indicating at least one vote made by a voter; creating a data structure comprising the at least one vote and a hash value of a preceding block; determining a new block hash value of the data structure; appending a new block comprising the data structure and the new block hash value to the vote blockchain; and storing the vote blockchain in the at least one memory.

In another embodiment of the present disclosure, a computerized method of vote tallying comprises initializing a vote blockchain with a vote blockchain genesis block, the vote blockchain genesis block comprising a voting machine identifier and a voting machine identifier hash value; storing the vote blockchain in at least one voting machine memory; iteratively, for a plurality of voters: receiving a signal indicating at least one vote made by a voter; creating a data structure comprising the at least one vote and a hash value of a preceding block; calculating a hash difficulty based on a vote trend and a voter check-in rate, the vote trend representing a percentage of votes for a candidate of a plurality of candidates out of a number of preceding votes, the voter check-in rate representing a number of voters arriving during a time period, wherein the hash difficulty represents a number of characters of a hash value that match a predetermined sequence determining a new block hash value of the data structure, the new block hash value beginning with the number of characters of the predetermined sequence determined by the hash difficulty; appending a new block comprising the data structure and the new block hash value to the vote blockchain; printing a receipt with the new block has value; and printing the new block hash value on a paper ballot scanned to provide the received signal.

DETAILED DESCRIPTION

Figure 1:
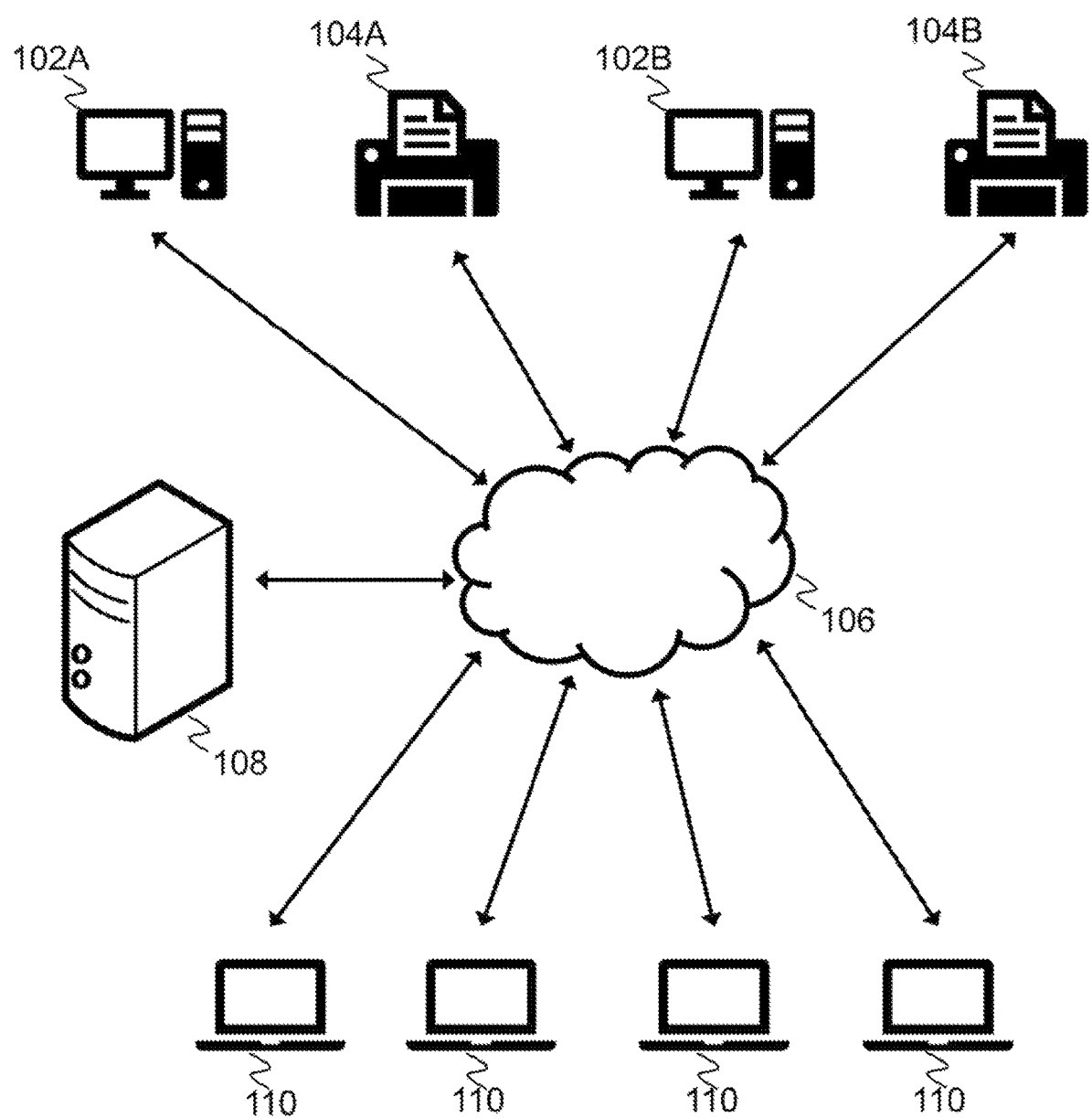
FIG. 1 is an illustration of devices of a voting system, consistent with embodiments of the present disclosure.

FIG. 1 is an illustration of devices of a voting system, consistent with embodiments of the present disclosure. FIG.

1 shows a plurality of voting check-in terminals 102A, 102B. Poll workers may use voting check-in terminals 102A, 102B to ensure that a prospective voter at a precinct is registered to vote according to, for instance, a state log. Voting check-in terminals 102A, 102B may communicate with one or more servers 108 using network 106 to access voter registration logs and verify voter identities. In some embodiments, voter check-in terminals 102A, 102B may comprise a scanner that scans a code on a mail-in ballot, for instance, and confirms that the mail-in ballot was sent by a registered voter who had requested a mail-in ballot.

Voting machines 104A, 104B of FIG. 1 are also connected to network 106. Voting machines 104A, 104B may be used to count ballots. For example, a voter may place a paper ballot into a scanner of voting machine 104A, which then scans the ballot, identifies markings on the ballot indicating the voter's selections, and records the selections. Further details of voting machines 104A, 104B will be provided subsequently.

Network 106 provides communication between voting check-in terminals 102A, 102B, and voting machines 102B, 104B. In some embodiments, voting check-in terminals 102A, 102B, and voting machines 102B, 104B may communicate with one or more servers 108 to record and access data. Network 106 may be wired or wireless, for instance, a WiFi, cellular, or ethernet connection. Network 106 may also be the Internet, and voting check-in terminals 102A, 102B, and voting machines 102B, 104B may communicate with server 108 using a secured connection.

FIG. 1 further illustrates a plurality of user devices 110. User devices 110 may be laptops, smartphones, tablets, and the like which connect to data stored on at least one server 108 via network 106. User devices 110 may have only read access to data stored on server 108.

In some embodiments, voter check-in terminals 102A, 102B, and voting machines 102B, 104B may be collocated. For example, a plurality of voting check-in terminals may be located in a polling place near a plurality of voting machines, and poll workers may use check-in terminals to verify a voter and provide a ballot to the voter, and the voter may use the voting machine to record the voter's votes. In some embodiments, a separate machine may print voter selections, while a voting machine 104A, 104B scans the printed selections and records the selections in a memory.

Figure 2:
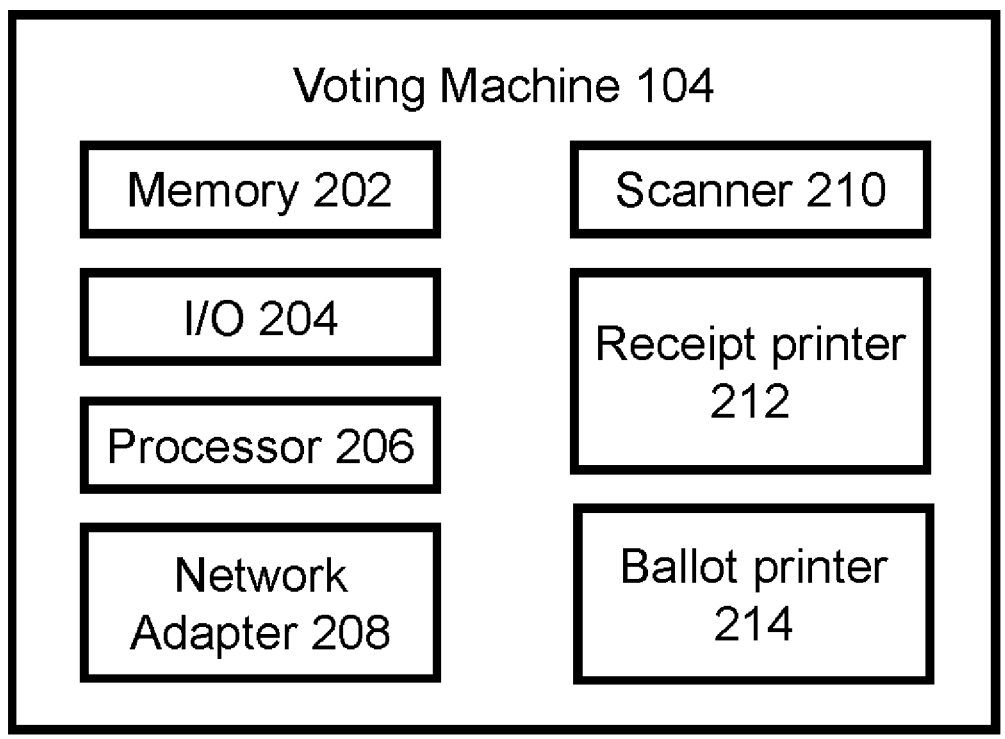
FIG. 2 is a diagram of a voting machine, consistent with embodiments of the present disclosure.

FIG. 2 is a diagram of a voting machine, consistent with embodiments of the present disclosure. A voting machine according to certain embodiments of the present disclosure contains a memory 202, input/output device 204, processor 206, and network adapter 208. Voting machine 104 may store instructions that are performed by processor 206, such as instructions to perform the vote tallying methods of the present disclosure. Processor 206 may include an application-specific integrated circuit (ASIC) or graphics processing unit (GPU) configured to perform cryptographic hashing algorithms.

Voting machine 104 may also include a scanner 210. Scanner 210 may be configured to scan paper ballots and interpret markings on paper ballots as corresponding to voter selections. For example, scanner 210 may be configured to scan paper ballots having circles filled in by a voter. Scanner 210 may also be used to identify QR codes, barcodes, and the like. Scanner 210 may have sufficient resolution to allow for optical character recognition of ballots by processor 206.

Voting machine 104 may also include a receipt printer 212. Receipt printer 212 may be used to provide a receipt to a voter after the voter's ballot is scanned by voting machine 104. Further, voting machine 104 may include a ballot printer configured to print additional information on a scanned ballot. For example, after scanner 210 scans a ballot, ballot printer 214 may print information on the scanned ballot. The information may be human readable, such as letters and numbers, computer readable, such as a barcode or QR code, or both. Voting machine 104 may further comprise a bin or other secure space that collects paper ballots for record keeping. In some embodiments, the voting machine 104 may receive indications of votes via a network adapter 208.

Figure 3:
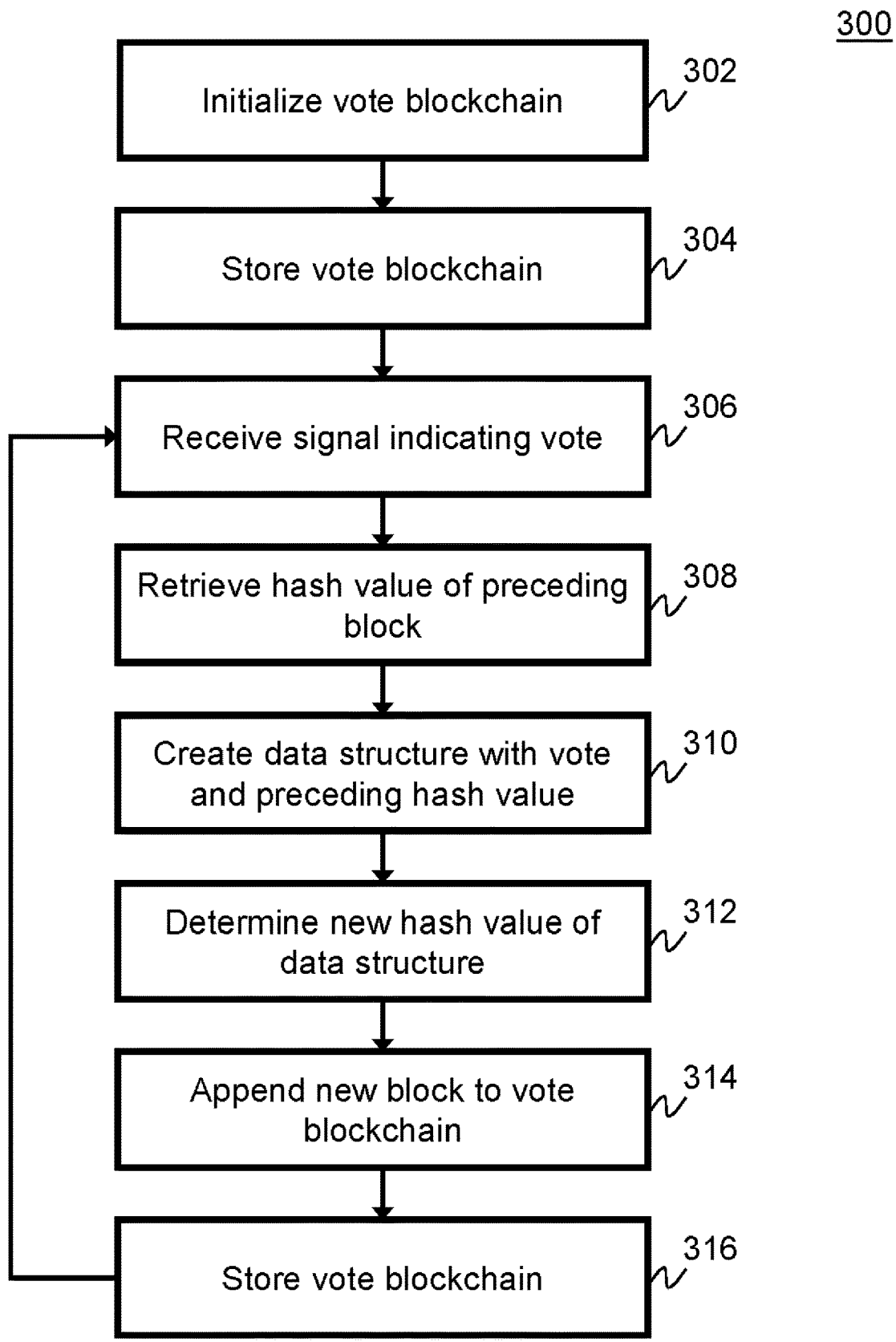
FIG. 3 is a flowchart illustrating a computerized vote tallying method, consistent with embodiments of the present disclosure.

FIG. 3 is a flowchart illustrating a computerized vote tallying method, consistent with embodiments of the present disclosure. Process 300 of FIG. 3 may be used to create an immutable log of votes and tallies by voting machine 104. Process 300 allows voting machine 104 to create a cryptographic hash of ballots, and incorporate the cryptographic hash into subsequent data structures. Process 300 may enable creation of a blockchain illustrating a log of counted votes which may be disseminated and checked by citizens, thus bolstering confidence in vote tallies and other records.

Process 300 begins at step 302 with initializing a vote blockchain with a vote blockchain genesis block, the vote blockchain genesis block comprising a voting machine identifier and a voting machine identifier hash value. The voting machine identifier may comprise, for example, an IP address, a MAC address, a machine ID, a precinct, a geographic location, or an operator identifier. Voting machine 104 may perform operations to conduct a cryptographic hash function. The cryptographic hash function may provide a code of fixed length in response to an input of arbitrary length. Further, it may be computationally fast to calculate the cryptographic hash but computationally impractical to determine an input having only the code. Examples of cryptographic hashing functions include SHA-256, SHA-1, MD5. This list is not exhaustive, and other cryptographic hash functions are envisioned. The genesis block may be data structure with a header comprising the hash value of the data structure. At step 304, voting machine 104 stores the vote blockchain in at least one voting machine memory. In some embodiments, the vote blockchain may be stored in a plurality of memories. For example, voting machine 104 may distribute the blockchain to a plurality of devices, such as server 108 or user devices 110.

Voting machine 104 begins counting votes at step 306. In step 306, voting machine 104 iteratively, for a plurality of voters, receives a signal indicating at least one vote made by a voter. The signal may be provided by scanner 210, for instance, and step 306 may include converting the scanned image to vote tallies, such as by identifying filled-in bubbles in a bubble sheet, or by performing optical character recognition. The signal may also be received electronically, such as from a touchscreen of the voting machine 104 or from a separate device connected electronically to voting machine 104, and a voter may indicate the voter's votes by selecting buttons on the touchscreen. Further, the signal may be a digital message, such as email, text message, voicemail, phone call, instant message, app-based message, and the like. The signal may indicate a plurality of votes for a plurality of categories. For example, the votes may be for president, senator, congressperson, approval of a constitutional amendment or referendum, tax increase, American Idol winner, and the like.

At step 308, voting machine 104 retrieves a hash value of a preceding block in the vote blockchain, and, at step 310, creates a data structure comprising the at least one vote and a hash value of the preceding block. The data structure may be, for instance, a JSON data structure, dictionary, list, comma separate values, and the like. The preceding block may be the block created immediately prior to the receiving of a signal at step 306. In some embodiments, voting machine 104 may confirm data of the previous block by accessing multiple copies of the previous block stored on different devices. For example, voting machine 104 may disseminate new blocks of the blockchain to a plurality of devices, such as other voting machines, servers, or user devices. Voting machine 104 may query any of the plurality of devices and retrieve the most recent block issued by voting machine 104. Voting machine 104 may compare the hash value of the block as reported by multiple sources. If the hash value matches between multiple sources, voting machine 104 may continue processing. However, if the hash value differs among the sources, this may indicate that the block has been tampered with, and voting machine 104 may issue a notification of a possible fraud. Voting machine 104 may also record the notification in the data structure, or may prevent further reception of signals. In this manner, the blockchain may have distributed and redundant storage, which can help identify fraud and increase the difficulty of tampering with vote counts or ballots, as a fraudulent person would have to alter blockchains stored on a plurality of devices in order to change votes and vote tallies, and possibly alter historical blocks saved locally on the plurality of devices. Further, in some embodiments, the data structure may comprise a time stamp, for instance of when the vote is recorded. This may provide further vote fidelity and impede fraud. That is, if votes or tallies are tampered with, the time stamps of preceding blocks stored would enable identification of a time window when fraud occurred, helping to catch a perpetrator.

Additionally, the vote blockchain genesis block may comprise an initial vote tally for at least one category, the initial vote tally indicating an initial number of votes that have been recorded for a corresponding category. For example, a genesis block may contain an entry showing "Candidate A: 0, Candidate B: 0". In some scenarios, a vote tally may begin with non-zero entries. Step 308 may also comprise determining a previous vote tally by accessing the preceding block, and step 310 may include adding at least one vote to the previous vote tally to determine a new vote tally; and creating the data structure to further comprise the new vote tally. In this way, the blockchain of the voting machine 104 may comprise a running total of the counted votes. This running total may provide voters greater insight into the counting of votes and bolster confidence that votes are counted and added correctly.

At step 312, voting machine 104 determines a new hash value of the data structure. Voting machine 104 may run the data structure through a hashing algorithm to determine the new hash value. In some embodiments, a plurality of votes may be added to a data structure prior to hashing, such as votes from, e.g., ten ballots. At step 314, voting machine 104 may append a new block comprising the data structure and the new block hash value to the vote blockchain. Step 314 may include correlating the new block and the preceding block in a memory, for instance, or numbering the new block in a sequence of the blocks of the blockchain. At step 316, voting machine 104 may store the vote blockchain, including the new block, in at least one voting machine memory. Step 316 may also include disseminating the new block, a subset of the vote blockchain, or the entire vote blockchain to other devices, such as a plurality of user devices, allowing redundant, distributed storage of the voting log as recorded in the vote blockchain. Voting machine 104 may then return to step 306 to receive a signal indicating a subsequent vote.

In some embodiments, the voting machine 104 may further comprise a printer. If the voting machine 104 comprises a printer, process 300 may include printing a receipt, the receipt recording the new block hash value. A voter may retrieve the receipt for later vote verification. For example, after a vote is scanned and the vote added to the blockchain, voting machine 104 may provide the voter with a receipt showing the hash value corresponding to the voter's vote. The voter may keep this receipt, and verify that the voter's vote was both counted and counted correctly by looking up the block of the blockchain corresponding to the hash value provided on the receipt. In this way, the voter may have confidence that his vote was counted, because a log exists of his vote. Additionally, the voter may know that the voter's vote was not tampered with, because the vote resides on a blockchain having hash values. Further, the voter may verify the count of all votes by viewing the blockchain and independently checking each reported vote and hash value for correctness. Further still, the voter's entry in the blockchain will remain anonymous, as no one except the voter has the receipt showing the hash value that may be used to identify which of the blocks correspond to the particular voter. Anonymity may be emphasized to a voter in that after the voter checks-in, nothing personally-identifiable need remain on the ballot. Despite this, the unique hash value provided to the user when his vote is counted allows him to confirm his own vote.

Additionally, in some embodiments, the voting machine 104 may further comprise a printer configured to print on a paper ballot after the ballot is scanned to provide the signal indicating selections made by a voter. The printer may print the new hash value on the paper ballot. Since the likelihood of two ballots residing and being counted in different blocks but having the same hash value is tremendously low due to the nature of cryptographic hash functions, printing the new hash value on the paper ballot may provide a means for further vote verification. If a discrepancy is noted in a ballot, perhaps by a voter checking to confirm that the ballot is recorded correctly in the blockchain, election workers may identify the particular ballot by the unique hash value printed on it. This may allow correction of a vote, or provide a narrow window of time when fraud could have occurred, or help troubleshoot voting machine 104 failures. In some embodiments, the hash value may be printed in a computer-readable code, such as a barcode or QR code, so that a plurality of ballots may be quickly scanned and a particular ballot isolated.

In this manner, individual voters would maintain physical receipts indicating unique hash values, and have access to the vote blockchain to determine if their vote existed. Hackers would therefore have to re-create a blockchain to match millions of paper receipts, while inserting fraudulent votes, and altering data stored in individual blocks so that the fraudulent data and real data have a hash collision (i.e., an identical hash value). Further still, if hash values are printed on paper ballots after counting, millions of paper ballots having verifiable hashes would remain in possession of government authorities. Thus, embodiments of the present disclosure provide computerized vote tallying methods that create instantly verifiable, tamper-evident, and highly fraud resistant voter logs.

However, in some scenarios, instant visibility of vote tallies may be undesirable. For example, election officials may wish to keep vote tallies secret to avoid discouragement of future voters who, seeing that their preferred candidate is losing, decide to forego voting. To provide the benefits of distributed vote blockchain duplication, while also eliminating the detriments of possible voter suppression, the blockchain may be encrypted before dissemination. For example, the blockchain may be encrypted using a private-public key pair, with the private key being held by election officials. Election officials may then distribute the key to decode the blockchain after polls close. In some embodiments, each block of a blockchain may be encrypted and distributed separately, either using the same or different keys for each block. This may further increase security of the voting tallies prior to a set announcement time, while also allowing citizens to have secured copies of voter logs on personal devices that may be decrypted after the key is publicized so that individual voters may verify voting logs.

Disseminating the blockchain to a plurality of devices has advantages that someone seeking to alter vote logs would be forced to alter many records, across many devices, each having differing security protocols, software, hardware, and user settings. Further, since the blockchain continually grows with each vote added, the alteration of many records must occur quicker than new votes are counted and added to the blockchain by the voting machine 104, including re-hashing each block. This transfer of authority to a decentralized network and its continuously and sequentially record of votes on a public "block", the computational difficulty of re-creating a blockchain and destroying and replacing copies saved across many user devices makes fraud nearly impossible.

Figure 4:
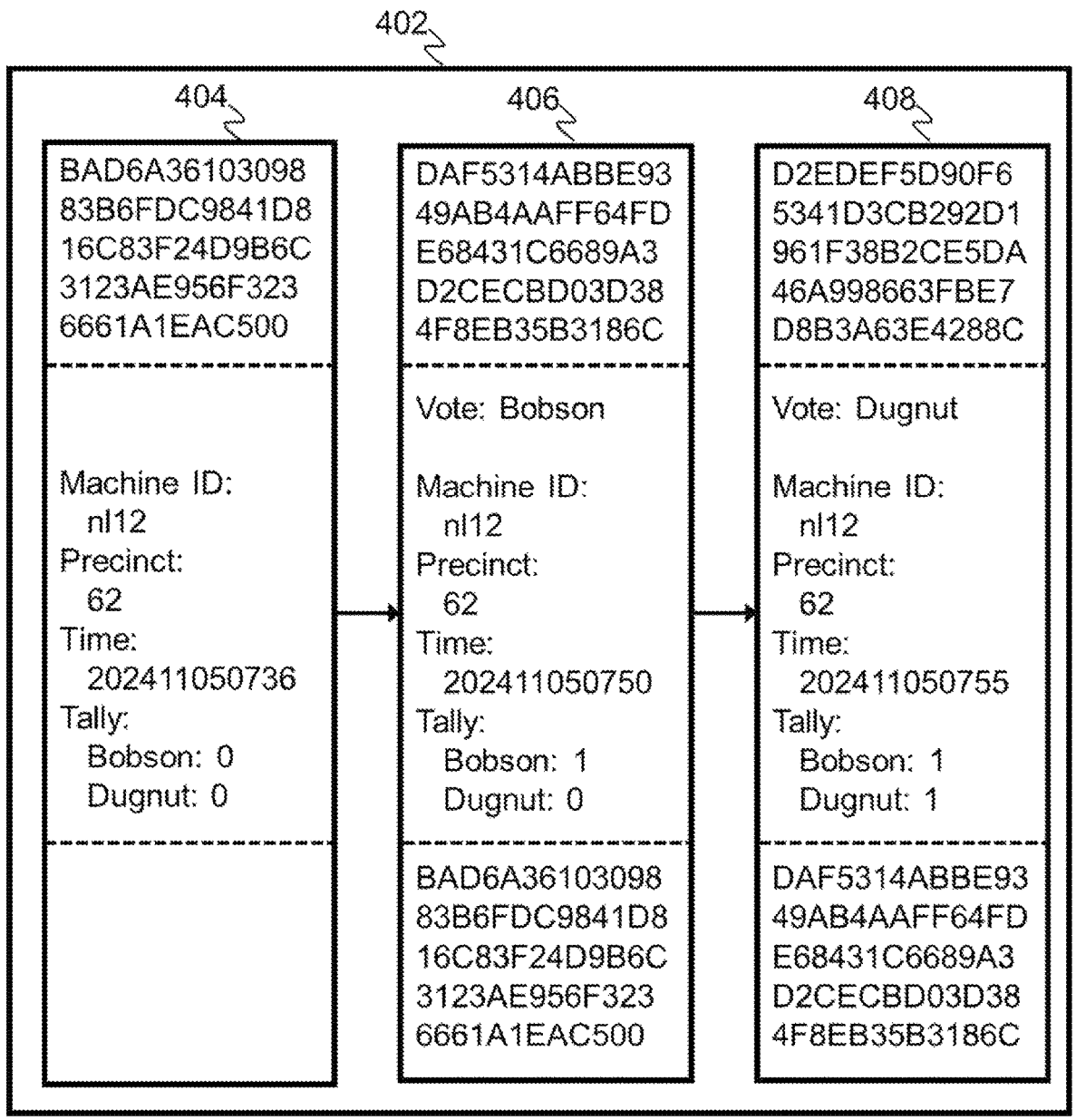
FIG. 4 is an illustration of a vote tallying blockchain, consistent with embodiments of the present disclosure.

FIG. 4 is an illustration of a vote tallying blockchain, consistent with embodiments of the present disclosure. Process 300 may be better understood by reference to the blockchain 402 of FIG. 4. Blockchain 402 comprises three blocks, 404, 406, and 408. Block 404 is a genesis block, comprising a body of data including machine ID, a precinct number, a timestamp, and an initialization tally. For example, block 404 shows a tally of zero votes for candidate Bobson, and zero votes for candidate Dugnut. A header of block 404 further includes a hash of the data in the body of the block. In the recent example, the hash is BAD6A3610309883B6FDC9841D816C83F24D9B6C3123AE95fiF93e6566ried ifrAfctcoM and was obtained using the SHA-256 algorithm.

After the first block 404 is created, voting machine 104 may create a second block 406 upon receipt of a ballot. For example, the body of block 406 shows that a vote was recorded for Bobson, and the tally has been updated to show one vote for Bobson and zero votes for Dugnut as of 07:50 on Nov. 5, 2024. A footer of block 406 includes the hash provided in the header of block 404. The body and footer of block 406 may be hashed to provide the hash stored in the header of block 406.

Third block 408 includes the hash of block 406 as a footer. The body of block 408 illustrates that a vote for Dugnut was recorded at 07:55, and the tally has also been updated to show one vote for Bobson and one vote for Dugnut. The body of block 408 and the footer of block 408 (which is also the header of block 406) may be hashed to provide the header of block 408. This process may repeat indefinitely until the voting period ends. In some embodiments, the blocks may be hashed after receipt of a set number of votes, such as every ten votes. This may decrease processing time as a hash is calculated less frequently, but also reduces vote log fidelity as any of the set number of votes may be fraudulent.

In some embodiments, a voting system may comprise a plurality of voting machines. Each voting machine may receive and report respective voting machine blockchains to another device which combines the blocks into a master voting log. In this way, voting logs of voting machines distributed throughout a voting area may be combined, tabulated, and secured. In some embodiments, this may happen in real time. Alternatively, records may be reported and secured periodically.

Figure 5A:
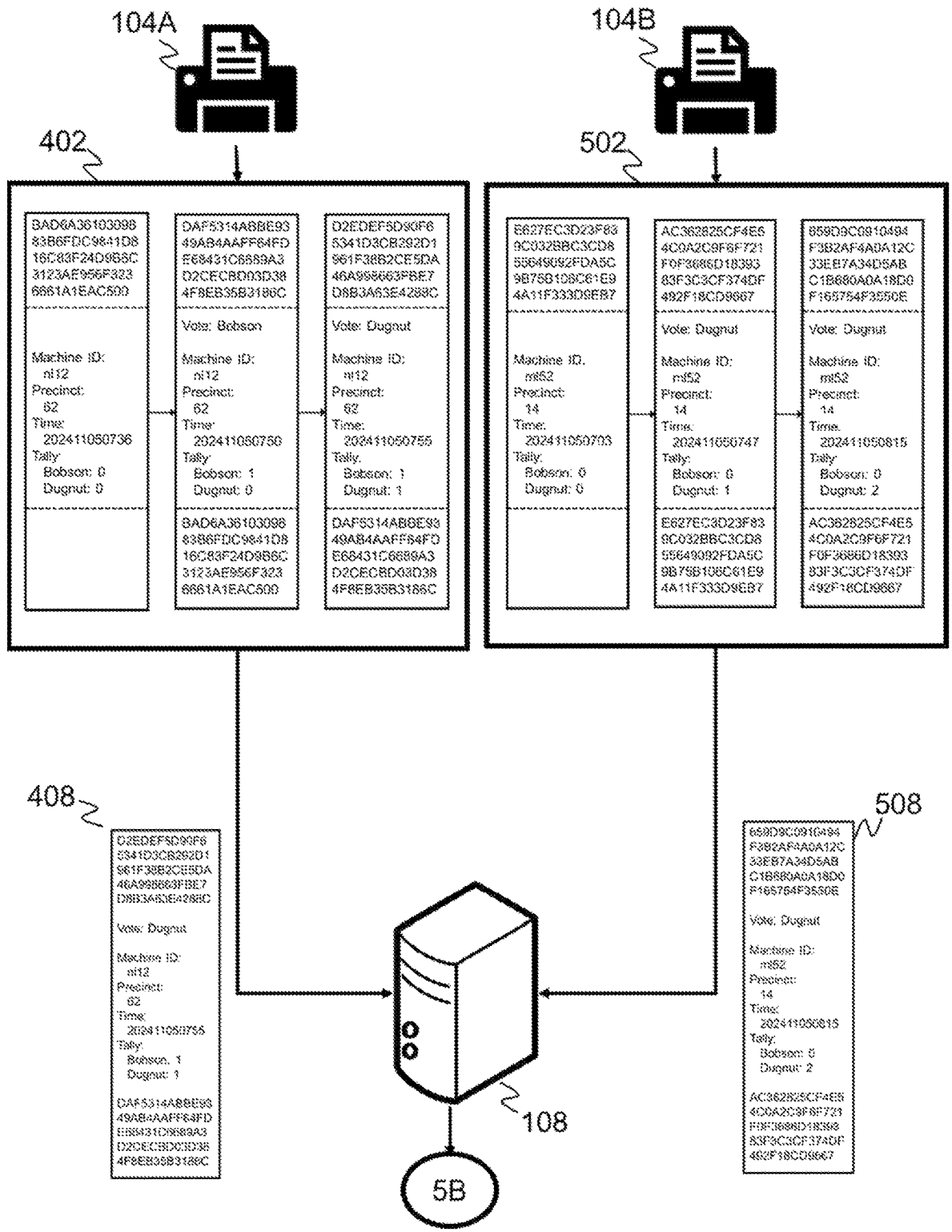
FIG. 5A is a diagram of a transmission of voting blocks, consistent with embodiments of the present disclosure.

FIG. 5A is a diagram of a transmission of voting blocks, consistent with embodiments of the present disclosure. As illustrated in FIG. 5A, a voting system may comprise a plurality of voting machines 104A and 104B. The voting system may further comprise a server 108. Server 108 may comprise at least one server processor and at least one non-transitory server storage medium comprising server instructions that, when executed by the at least one server processor, cause the at least one server processor to perform server operations. For instance, server 108 may initialize a master blockchain with a master genesis block, and store the master blockchain in at least one server memory. Server 108 may be a plurality of individual devices or virtual machines. The master blockchain genesis block may include a server identifier, time stamp, configuration (including software, hardware, and network configuration), and a master blockchain vote tally initialization.

Server 108 may iteratively, for each of the plurality of voting machines, receive a block of a vote blockchain of a voting machine. Server 108 may also receive a vote blockchain. For instance, as shown in FIG. 5A, a plurality of voting machines 104A, 104B produce respective voting machine blockchains 402, 502 based on received votes, for instance using process 300. When a block of a vote blockchain is completed, such as when a hash is calculated, the block may be transmitted to server 108. Thus, as shown in FIG. 5A, voting machine 104A transmits block 408 of blockchain 402 to server 408, and voting machine 104B transmits block 508 of blockchain 502 to server 108. Voting machines may transmit blocks each time a new block is completed, or voting machines may transmit blocks periodically by sequence, such as every fifth block, or by time, such as every fifteen minutes.

Server 108 may retrieve the master blockchain, which may be stored in the memory. Alternatively, copies of the master blockchain may be disseminated, and server 108 may compare multiple blockchains stored on multiple devices by checking hash values to ensure that the blockchain has not been tampered with. Server 108 may then continue by creating a master data structure comprising the received block and a hash value of a preceding block of the master blockchain; determining a new master block hash value of the master data structure; appending a new master block comprising the master data structure and the new master block hash value to the master blockchain; and storing the master blockchain in the at least one server memory.

Figure 5B:
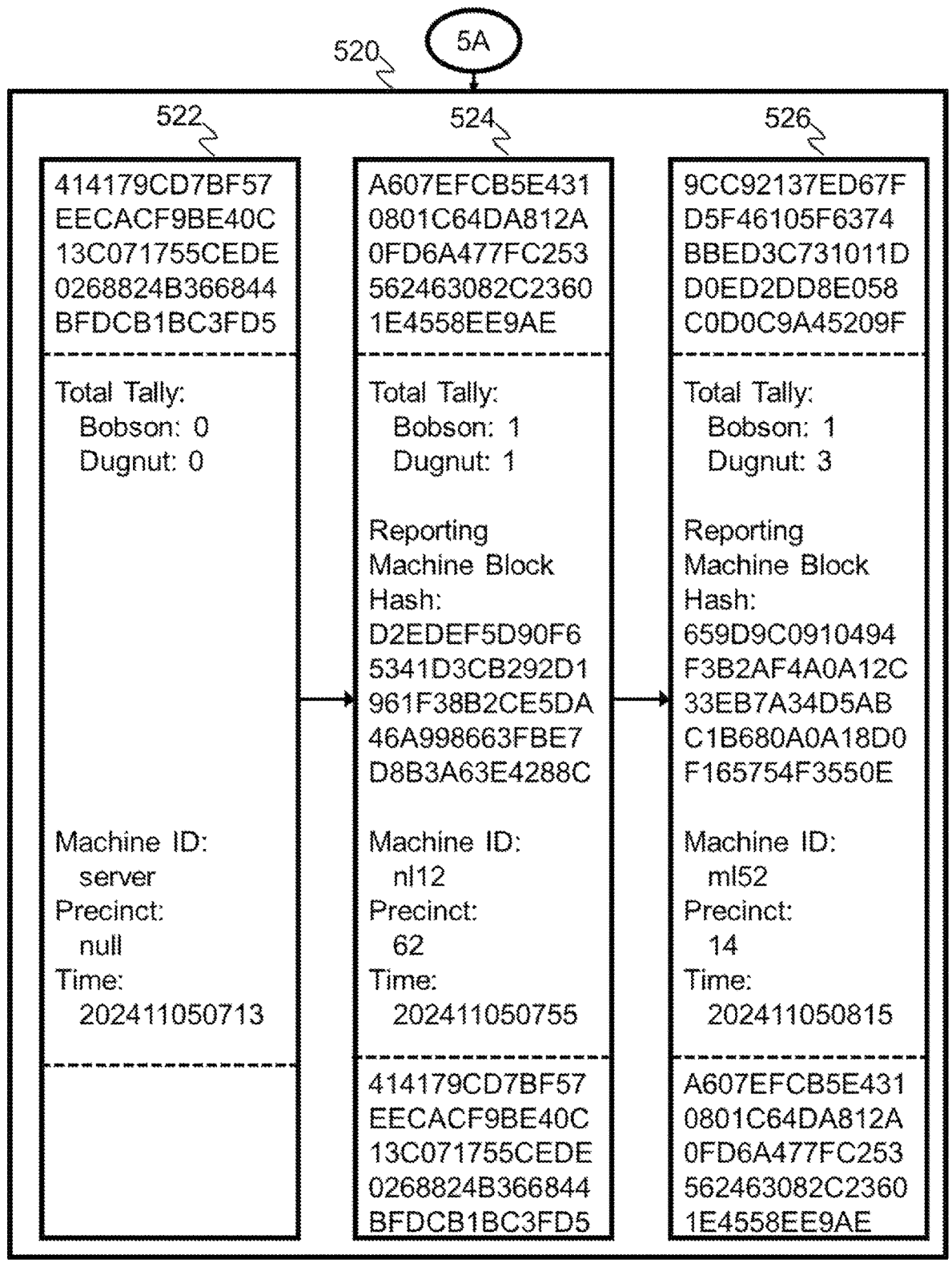
FIG. 5B is a diagram of a master blockchain, consistent with embodiments of the present disclosure.

FIG. 5B illustrates this process of server 108. FIG. 5B is a diagram of a master blockchain, consistent with embodiments of the present disclosure. The voting blockchain blocks provided by voting machines 104A and 104B in FIG. 5A flow into master blockchain 520, as shown in FIG. 5B. Master blockchain 520 begins with a master genesis block 522. Master genesis block 522 contains a server ID, precinct field, and time stamp. In some embodiments, the master genesis block may also comprise an initial vote tally for the at least one category, the initial total vote tally indicating an initial total number of votes that have been recorded for the corresponding category. Master genesis block 522 includes a header having a hash value of the initialization information.

Data from block 408 is then incorporated into a master data structure of block 524. The master data structure of block 524 includes the reporting machine information (ID, precinct, and time stamp), as well as the hash value of the block. Thus, the reporting machine block hash value in the body of block 524 matches the header of block 408. The footer of block 524 matches the header of the preceding block (in this case, master genesis block 522). In some embodiments, server 108 may determine a previous total vote tally by accessing the preceding block of the master blockchain; and add a voting machine vote tally to the previous total vote tally to determine a new total vote tally, and the master data structure may comprise the new vote tally. Thus, as shown in FIG. 5B, block 524 records the vote tally as reported by block 408, specifically, one vote for Bobson and one vote for Dugnut. In some embodiments, server 108 may add new votes to the tally. For example, a voting machine may report new votes in a block, and server 108 may add the new votes to the previous tally. Alternatively, voting machine 104 may report a voting machine tally, and server 108 may search through the master blockchain, identify the last reported tally from the reporting voting machine, determine a difference between the previous voting machine tally and the current voting machine tally, and add the difference to the master blockchain tally.

Once server 108 completes the master data structure, the data structure is hashed, and the hash is added as a header to block 524. Hashes may be added anywhere in a block, and adding a hash to the header is merely an example embodiment. The header of block 524 then becomes the footer of master blockchain block 526, and data from block 508 is incorporated into block 526. The body and footer of block 526 are hashed, and the hash is recorded as the header of block 526. This sequence may repeat for a plurality of voting machine blocks throughout a voting period. New data from new voting machine blocks may be added to the master blockchain in sequence of reporting time, for instance. In some embodiments, received blocks may be held in a buffer before processing by server 108, such as when report volumes are high. Further, the voting system may include intermediary servers or other devices between voting machines and the master blockchain. Intermediary servers may collect data from a set of voting machines and create intermediary blockchains, which are then incorporated into a master blockchain. In this way, the voting system may prevent backlogs and missed data from a large number of voting machines and high vote frequencies. For example, if no intermediary servers are present, millions of votes may be reported in a short time period to server 108. Server 108 may be unable to collect, hash, and store each of the millions of vote reports. One solution is to provide voting machine blocks to server 108 at intervals, which may affect voting record fidelity as multiple votes are combined into one block. Alternatively, the blocks may be reported to an intermediary server connected to a subset of voting machines. For example, 2,000 voting machines may record 1,000 votes each in a day, resulting in 2,000,000 votes. If 100 intermediary servers are assigned to 20 voting machines each, each intermediary server needs to process 20,000 voting machine blocks. Each intermediary server may then report its blockchain every hour or every 1000 votes, for instance, to server 108, which would tabulate 100 intermediary blocks per hour. Because each block is hashed and contains a unique hash value, this system may produce a nested blockchain that permits faster processing time while maintaining an immutable, high fidelity record of cast votes. Additional layers of intermediary servers may also be included in the voting system, further reducing the processing and network capabilities of each individual server, improving redundancy, limiting the possibility of widespread outages, improving overall vote processing times, and further complicating efforts to commit fraud be increasing voting system complexity.

Figure 6:
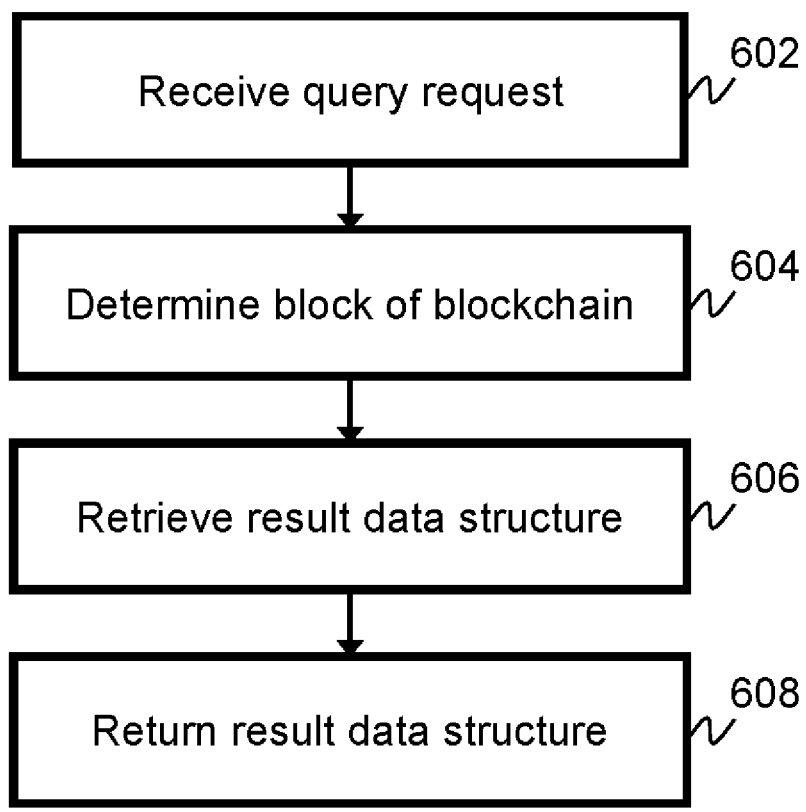
FIG. 6 is a flowchart illustrating a voter confirmation query process, consistent with embodiments of the present disclosure.

FIG. 6 is a flowchart illustrating a voter confirmation query process, consistent with embodiments of the present disclosure. As stated previously, a voting system may include a server or a plurality of servers. The servers may have access to a blockchain, such as a master blockchain, and voters may receive a printed receipt comprising a hash value associated with their votes. Process 600 of FIG. 6 may enable election officials to provide access to anonymized voting logs so that individual voters may confirm their vote was counted correctly, while not revealing the identity of any individual voters.

At step 602, server 108 may receive a query request from a user device, for instance, via the internet and an election official website. The query may contain a query hash value corresponding to a block recording the voter's vote and printed on a receipt given to the voter after scanning his ballot. Server 108 may determine a block of the blockchain comprising the query hash value at step 604. This step may comprise querying a database storing hash values in correlation to respective data structures, such as a SQL database created using data of a voting machine blockchain. At step 606, server 108 may retrieve a result data structure, and return the result data structure to the user device at step 608, for instance, on a website where the voter input the voter's hash value. In this way, the voter can view his particular votes, but only the voter will know these votes were his votes, as no one else will have a copy of the receipt showing the corresponding hash value, and, as in some embodiments, no personal information is contained in the block along with the vote log. Although server 108 is recited in this example embodiment of process 600, any device may be used to query the database. That is, the server that creates the master blockchain and the server that responds to user queries may be, but are not necessarily, the same server.

Another way that fraud, or the appearance of fraud, enters traditional voting systems is that citizens have no evidence that only registered voters have voted. Although previously disclosed methods provide confidence than an individual's votes are counted and reported correctly, these methods are unable to provide confidence that no extra, illegal ballots were counted. To remedy this, the voting system may produce a voter check-in blockchain. The voter check-in blockchain may provide an immutable log of voters that have either checked in to a precinct in person and voters whose mail-in ballots have been received and opened. By comparing the number of checked-in voters to the tally reported in the master blockchain, voters may have confidence that no fake votes entered the system. Authorities may also be able to identify people who voted fraudulently, for instance, those who lied during registration to meet voting requirements and still voted, or double voted by submitting absentee ballots and voting in person. Further, if the voter check-in blockchain is timestamped, it may assist authorities in identifying imposters who claim someone else's identity when voting. In order to assure anonymity of actual votes, though, the voter check-in blockchain and voting machine blockchains may be kept separate by not providing personal information on ballots, such that there is a break in information flow between check-in and vote counting.

Figure 7:
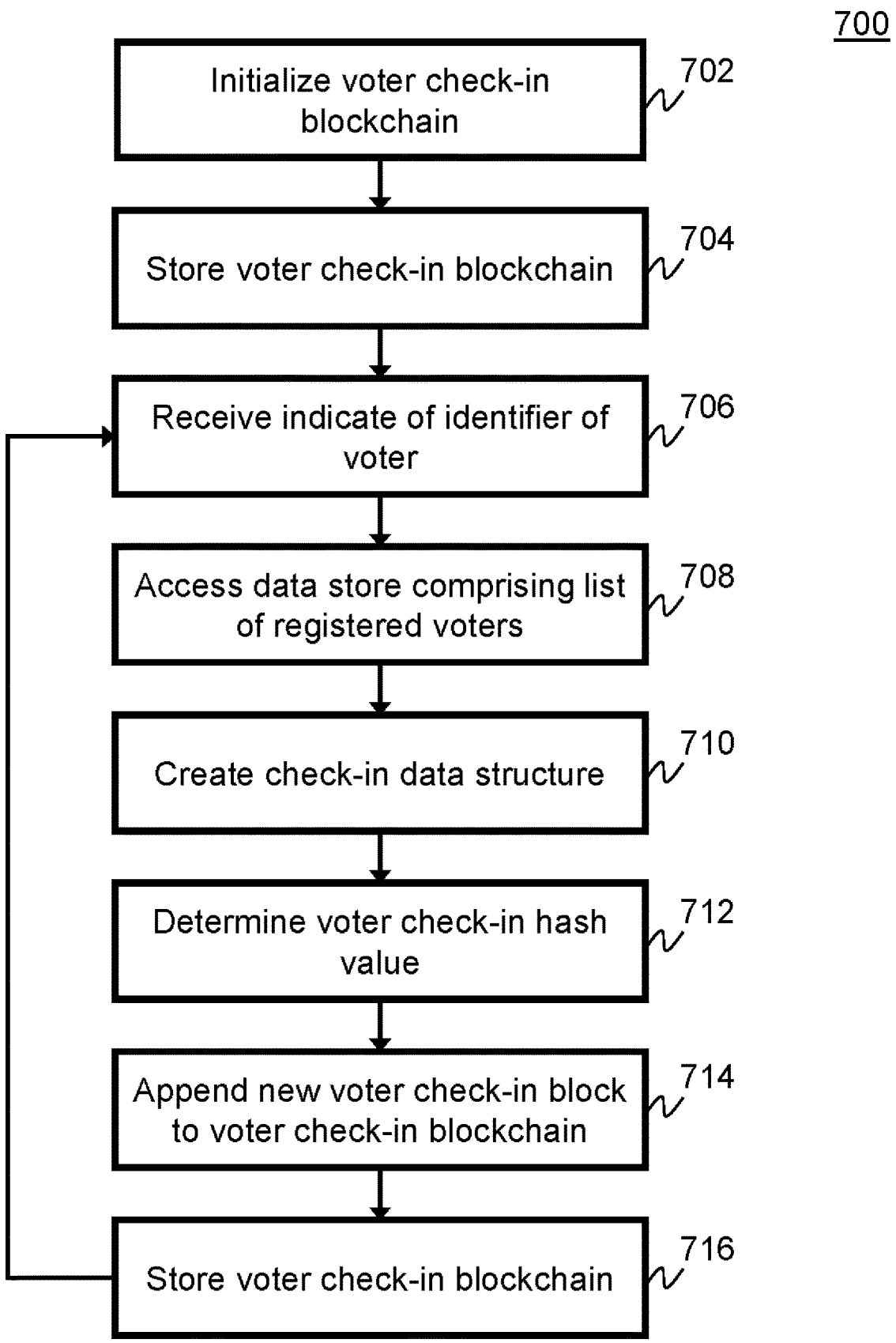
FIG. 7 is a flowchart illustrating a voter check-in confirmation method, consistent with embodiments of the present disclosure.

Thus, the voting system of the present disclosure may comprise at least one voter check-in terminal comprising: at least one terminal processor; and at least one non-transitory terminal storage medium comprising terminal instructions that, when executed by the at least one terminal processor, cause the at least one terminal processor to perform terminal operations. FIG. 7 is a flowchart illustrating a voter check-in confirmation method, consistent with embodiments of the present disclosure. At step 702, the voter check-in terminal may initialize a voter check-in blockchain with a voter check-in genesis block, the voter check-in genesis block comprising a check-in terminal identifier and store the voter check-in blockchain in at least one terminal memory at step 704. The voter check-in terminal may iteratively, for the plurality of voters, check in voters starting with receiving an indication of an identifier of a voter at step 706. For instance, a poll worker may select an option on a user interface of the voter check-in terminal indicating that the voter's ID has been checked, or inputting information from a voter such as driver's license number. At step 708, the voter check-in terminal accesses a data store comprising a list of registered voters. The list may be a database hosted by an election board, for instance, comprising registered voters. Further, the voter check-in terminal may access a master voter check-in blockchain on a server, such as server 108. The voter check-in terminal may determine if the identifier of the voter is present in the master check-in blockchain, thus determining if someone with the same voter identifier has already voted. The voter check-in terminal may then issue an error indicating that the voter may not vote again, or indicate that the voter must be provided a provisional ballot, and append to the check-in data structure an indication that the voter has already voted.

At step 710, the voter check-in terminal creates a check-in data structure containing the identifier in response to the voter being among the list of registered voters. In some embodiments, the check-in data structure may contain an indication that the voter has checked-in, without the identifier.

At step 712, voter check-in terminal determines a voter check-in hash value of the check-in data structure, and, at step 714, appends a new voter check-in block comprising the check-in data structure and the new voter check-in hash value to the voter check-in blockchain. Voter check-in terminal then stores the voter check-in blockchain in the at least one memory at step 716. The voter check-in block chain may also be disseminated to user devices, or blocks and/or blockchains provided to intermediary or master servers, similar to the methods described above in regard to voter blockchains. In this way, a separate blockchain recording an immutable log of voter check-ins may be created, and may contain timestamps of check-ins. This blockchain may also be made available to the public, so that any individual may query the voter check-in blockchain and see if someone voted in their name. Alternatively, election officials may decide to sanitize the blockchain, and record time stamps of check-ins, but not names of voters, to further ensure voter anonymity, if, for instance, local laws require hiding fact of voting. Nonetheless, a log of every check-in may be useful to identify fraud, such as if a voter check-in rate exceeds what a precinct is capable of handling, which may indicate fraudulent votes, or if a number of votes exceeds a number of check-ins.

In some embodiments, the voting system may be used to count mail-in ballots. When this occurs, the voting system may provide additional features to ensure integrity of a mail-in ballot system. These additional features may provide mail-in voters an opportunity to confirm that their vote was recorded, and was recorded properly, by querying a master voter check-in blockchain or a master voting log blockchain. However, because mail-in voters are not present to receive a receipt upon scanning their ballot, further steps may be required.

When election officials receive mail-in ballots, the officials may use a voter check-in terminal to record that the ballot was received. In some embodiments, the voter check-in terminal may use the code provided to the voter on the ballot as a voter identifier, and ensure that the code matches a code database prior to counting the ballot. If the code matches a database of codes, then the voter may be checked in on a voter check-in block chain. If the code does not match, the ballot may be fraudulent. For example, if the codes are sufficiently complex, false ballots could not be printed because the ballots would not record verifiable voter codes as recorded in a master code database. Paper ballots mailed to mail-in voters may be provided with a code. Mail-in voters may be provided a receipt comprising the code, such as a perforated section of the mail-in ballot that a voter may separate and retain. Alternatively, a ballot may provide a section for a voter to provide a code, such as a string of characters and/or numbers. For example, the identifier of the voter may be a code provided on a paper ballot mailed to a voter. The code may be a string of characters, such as a PIN, a QR code, or a barcode.

After the ballot is marked as received, the ballot may be sent to a voting machine comprising a scanner for scanning. When the ballot is scanned, the voting machine may determine the code based on an image provided by the scanner. For example, a paper ballot may provide a user with a receipt comprising a human-readable code, while the paper ballot may have printed thereon a computer-readable representation of the code, such as a QR code or barcode. The computer-readable representation may also be encrypted, such that a key is required to determine the code, further inhibiting fraud. Additionally, when the code is determined based on the image provided by the scanner of a voting machine, the voting machine may append the code to the data structure, and create a block of a voting machine blockchain comprising the ballot's vote and the ballot's code.

The voting system may provide a method for mail-in voters to verify that their vote is properly recorded in a master vote log blockchain. For example, the voting system may comprise a server such as server 108. The server may receive, from a user device, a query request comprising the code; determine a block of the blockchain comprising the code; retrieve a data structure corresponding to the determined block; and provide the data structure to the user device. Thus, while the master vote log blockchain may be publicly-viewable, in some embodiments only the voter having a printed receipt provided with the ballot may determine which vote belonged to him, and can have confidence that his vote was properly recorded.

In some scenarios, a read-error may cause a ballot to be improperly recorded in a blockchain. However, because the blockchain is immutable, the errant ballot cannot be retracted. Thus, the voting system may provide a separate means to allow correction of votes, if, for instance, a voter notices that the vote corresponding to his hash value has incorrect results. The voting system according to the present disclosure may therefore comprise a plurality of voting machines, wherein a set of the vote counting machines perform certain operations to count vote correction. Due to the risk of fraudulent corrections, such as someone finding another person's receipt and attempting to change the vote corresponding to the receipt, the correction blockchain may be segregated from the master blockchain. In some embodiments, a receipt comprising a hash value may be required in order to enter a vote correction.

Figure 8:
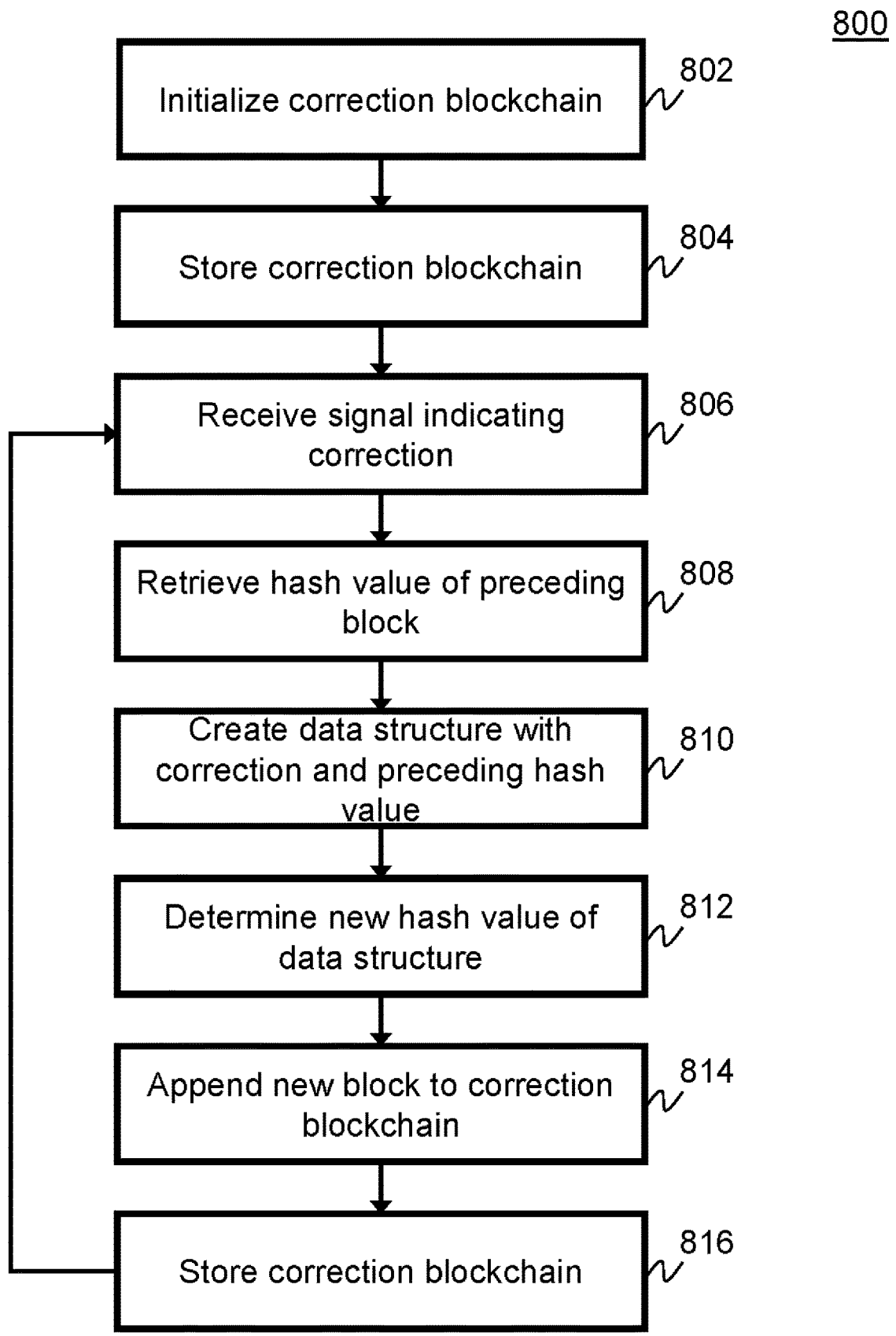
FIG. 8 is a flowchart illustrating a vote correction method, consistent with embodiments of the present disclosure.

FIG. 8 is a flowchart illustrating a vote correction method, consistent with embodiments of the present disclosure. Voting machine 104 may perform steps of process 800 shown in FIG. 8, for instance. Process 800 begins with step 802 to initialize a correction blockchain with a correction blockchain genesis block, the correction blockchain genesis block comprising a correction tally and a correction hash value. At step 804, voting machine 104 store the correction blockchain. At step 806, voting machine 104 receives a correction signal corresponding to a correction vote, such as a signal from a scanner with a ballot marked as a correction ballot. The correction ballot may also have a hash value corresponding to a block of a vote blockchain comprising the vote that is being corrected. At step 808, voting machine 104 retrieves a hash value of a preceding block, and, at step 810, voting machine 104 creates a correction data structure comprising the corrected vote, the correction tally, and a hash corresponding to an incorrectly-counted vote. At step 812, voting machine 104 determines a correction block hash value of the correction data structure; and at step 814, appends a correction block comprising the correction data structure and the correction block hash value to the correction blockchain. At step 816, voting machine 104 stores the correction blockchain in the at least one memory. The correction blockchain may also be distributed, encrypted, processed by intermediary servers, and/or combined with other correction blockchains into a master correction blockchain. A master correction blockchain may be combined with a master vote log blockchain to determine final election results.

Figure 9:
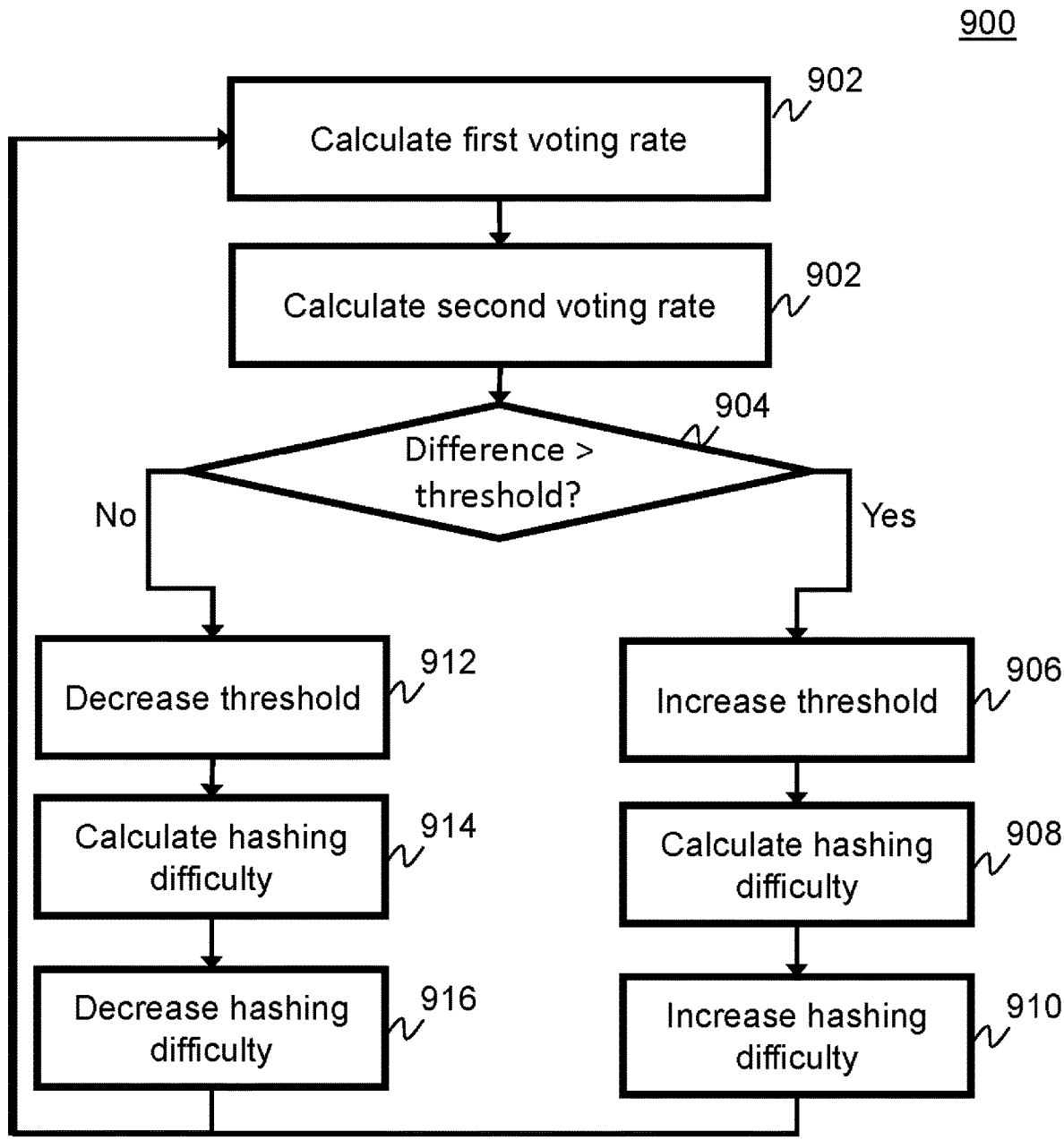
FIG. 9 is a flowchart illustrating a hash difficulty determination method, consistent with embodiments of the present disclosure.

In some scenarios, someone may attempt to feed many fraudulent votes into a voting machine to sway election results, or corrupt a scanner or a scan interpretation software to preferentially collect votes for their preferred candidate. To safeguard against this, the voting system of the present disclosure may introduce increased hashing difficulty to slow counting and block reporting, thereby reducing the impact of such fraud. Process 900 of FIG. 9 illustrating a hash difficulty determination method, consistent with embodiments of the present disclosure. Process 900 may be implemented by voting machine 104, for instance.

At step 902, voting machine 104 calculates a first voting rate, the first voting rate representing a number of votes for one option of a category over a preceding first set of votes; and at step 902 calculates a second voting rate, the second voting rate representing a number of votes for one option of a category over a preceding second set of votes, the second set of votes comprising the first set of votes. For example, the first voting rate may be a number of votes for candidate A out of a preceding 50 votes, while the second voting rate may be a number of votes for candidate A out of a preceding 500 votes. The voting rates may also be a ratio of candidate A to candidate B, for instance, or a ratio of votes for to votes against an issue.

At step 904, voting machine 104 may determine if a difference between the first voting rate and second voting rate is above a threshold. If step 904 is YES, voting machine 104 may proceed to increase the threshold at step 906, and calculate a hashing difficulty at step 908. For example, a hashing difficulty may be a requirement that a first N characters of a new block hash value match a sequence. To meet this requirement, voting machine 104 may add a nonce value to a section of the block, and iteratively hash and select a new nonce value until the hash begins with, for example, a string of five zeros. This therefore increases the amount of time required to provide a hash and complete a block, thereby increasing the amount of time until a next vote may be counted. Further, the hashing difficulty may be based on a check-in rate representing a number of voter check-ins during a preceding time period. In this way, if many voters are arriving, the difficulty may remain low so as to enable quick processing of many voters, as fraud may be unlikely during busy voting periods. On the other hand, when check-in rates are slow, fewer people are present, the ability to commit fraud increases, and the need for quick counting decreases. Thus, hashing difficulty may be higher. At step 910, voting machine 104 increases the hashing difficulty, and returns to step 902 to calculate new voting rates.

Alternatively, if the difference is below the threshold at step 904, step 904 is NO, and voting machine 104 may decrease the threshold at step 912, calculate a hashing difficulty at step 914, and decrease the hashing difficulty at step 916. In this way, voting machine 104 may have a hashing difficulty that is proportional to a difference between the first voting rate and the second voting rate.

Figure 10:
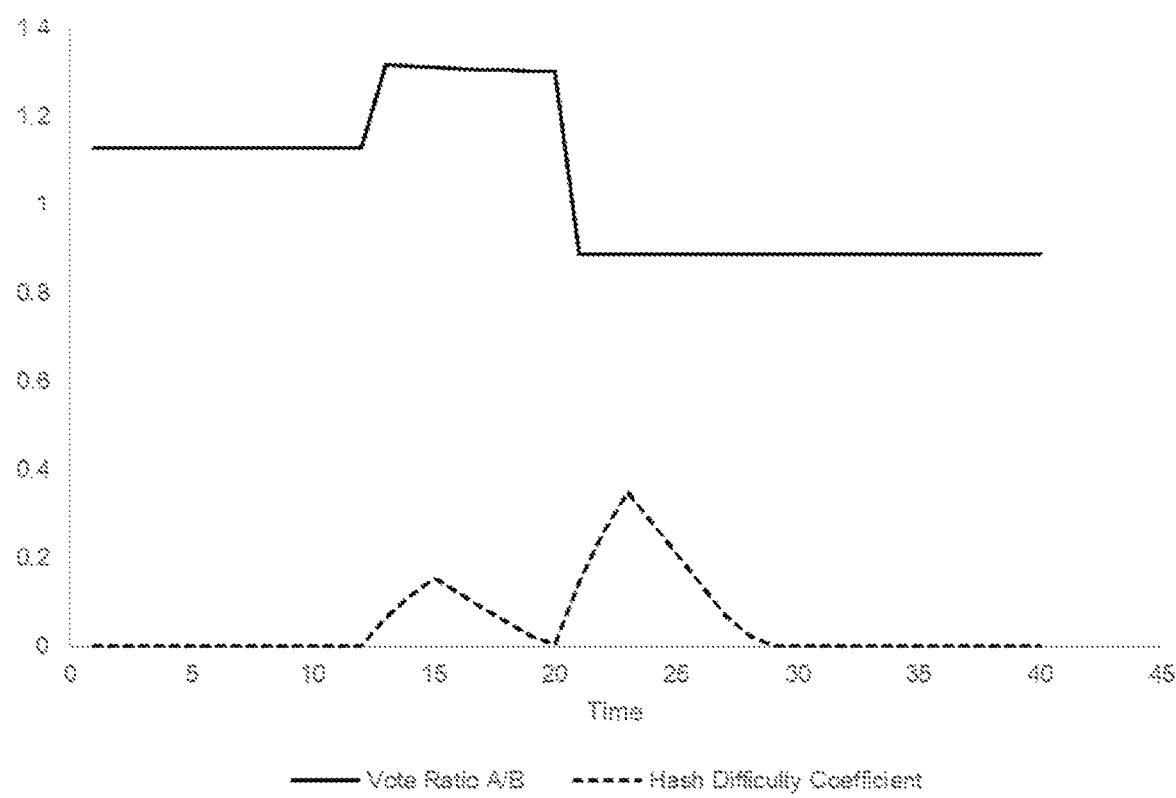
FIG. 10 is a diagram illustrating an example hash difficulty over time, consistent with embodiments of the present disclosure.

FIG. 10 is a diagram illustrating an example hash difficulty over time, consistent with embodiments of the present disclosure. FIG. 10 may result from operation of process 900. As shown in FIG. 10, an initial voting ratio for candidate A to candidate B is approximately 1.13, meaning candidate A receives 13% more votes than candidate B in the past hour, for instance. As time goes on, however (or, in some embodiments, as additional votes are added), the ratio of A to B jumps suddenly to 1.38 at time t=13 hours. Thus, during the preceding hour, an unusual number of votes for candidate A were scanned. The short-term average therefore exceeds a long-term average, and the difficulty increases, indicating that voting machine 104 requires additional time to count ballots, slowing down the ability to inject large batches of ballots for a single candidate.

However, as additional ballots are added, the ratio remains fairly constant, indicating that the jump may have been due to a different demographic casting ballots in a different frequency than a first demographic. Thus, the short-term average and long-term average begin to converge (not shown), and the hashing difficulty decreases back to a low difficulty, allowing quick vote counting as the likelihood of fraud decreases.

At time t=20, a large number of ballots are cast in favor of candidate B, such that the ratio drops from approximately 1.3 to 0.8. As a result, the hashing difficulty increases again to prevent someone from quickly counting a large number of possibly fraudulent votes. As time progresses, though, additional votes are cast in a similar ratio, indicating that yet another set of voters are consistently voting for candidate B over candidate A. Thus, likelihood of fraud decreases, and hashing difficulty decreases.

In some embodiments, hashing difficulty may be determined by a single category on a ballot, such as vote for president. Hashing difficulty may also be determined by a correlation function of ballots representing a similarity value between ballots having multiple categories. For example, if ballots comprise a category for president, senator, and representative, and a small set of ballots have identical votes for all three, hashing difficulty may increase quickly. However, if there are variations in the three selections among a set of ballots, the likelihood of fraud is decreased, and hashing difficulty may not increase as much. Further, in some embodiments, the hashing difficulty may be based on a proportional-integrative-derivative (PID) control. For example, the hashing difficulty may be a sum of values comprising a first value proportional to a current value of a difference, a second value proportional to a historic cumulative difference, and a third value proportional to a rate of change of a difference. Thus, a PID-controlled hashing difficulty may provide greater fidelity fraud detection, and also serve as a flag of potential issues for later analysis.

Process 900 thereby slows fraud in real-time, while providing an indication to citizens that a section of a blockchain may be fraudulent. Process 900 may also be used for identifying fraudulent transactions in a blockchain, such as currency transactions, by identifying and slowing spending rates, for instance. Citizens may then later analyze a blockchain and see when and where fraud may have occurred. Citizens may also independently review voting rates, and determine fraud as being the absence of an increased difficulty when increased difficulty should have been triggered. When this is identified, an individual ballot box may be hand counted, reducing the cost and duration of hand counting, and providing prompt election results.

A further embodiment of the present disclosure includes a computerized method of vote tallying comprising: initializing a vote blockchain with a vote blockchain genesis block, the vote blockchain genesis block comprising a voting machine identifier and a voting machine identifier hash value; storing the vote blockchain in at least one voting machine memory; iteratively, for a plurality of voters: receiving a signal indicating at least one vote made by a voter; creating a data structure comprising the at least one vote and a hash value of a preceding block; calculating a hash difficulty based on a vote trend and a voter check-in rate, the vote trend representing a percentage of votes for a candidate of a plurality of candidates out of a number of preceding votes, the voter check-in rate representing a number of voters arriving during a time period, wherein the hash difficulty represents a number of characters of a hash value that match a predetermined sequence; determining a new block hash value of the data structure, the new block hash value beginning with the number of characters of the predetermined sequence determined by the hash difficulty; appending a new block comprising the data structure and the new block hash value to the vote blockchain; printing a receipt with the new block has value; and printing the new block hash value on a paper ballot scanned to provide the received signal.

Particular embodiments of the present disclosure may be implemented into any of a variety of circuitry, including programmable logic devices ("PLDs"), field programmable gate arrays ("FPGAs"), programmable array logic ("PAL") devices, or as application specific integrated circuits. Further embodiments may include microcontrollers with memory (such as EEPROM), embedded microprocessors, firmware, software, etc. In some embodiments, the computerized methods of the present disclosure may be provided on a non-transitory computer readable storage medium, which causes one or more processors to perform the operations of the present disclosure.

Various embodiments disclosed herein may be realized using any number of combinations of hardware, firmware, software, or non-transitory computer-readable storage medium Computer-readable media in which such formatted data or instructions may be embodied include, but are not limited to, non-volatile storage media in various forms (e.g., optical, magnetic or semiconductor storage media), CDs, DVDs, hard drives, flash drives, SD disks, and the like. Further, devices of the present disclosure may communicate using carrier waves that may be used to transfer such formatted data or instructions through wireless, optical, or wired signaling media or any combination thereof. Examples of transfers of such formatted data or instructions by carrier waves include, but are not limited to, transfers (uploads, downloads, e-mail, etc.) over the Internet or other computer networks via one or more data transfer protocols (e.g., HTTP, FTP, SMTP, and so on).

As used in the present disclosure, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A voting system comprising:
   at least one voting machine comprising:
   at least one voting machine processor; and
   at least one non-transitory voting machine storage medium comprising instructions that, when executed by the at least one voting machine processor, cause the at least one voting machine processor to perform voting machine operations comprising:
   initializing a vote blockchain with a vote blockchain genesis block, the vote blockchain genesis block comprising a voting machine identifier and a voting machine identifier hash value;
   storing the vote blockchain in at least one voting machine memory;
   iteratively, for a plurality of voters:
      receiving a signal indicating at least one vote made by a voter;
      creating a data structure comprising the at least one vote and a hash value of a preceding block;
      determining a new block hash value of the data structure;
      appending a new block comprising the data structure and the new block hash value to the vote blockchain; and
      storing the vote blockchain in the at least one voting machine memory.

2. The voting system of claim 1, wherein the vote blockchain genesis block comprises an initial vote tally for at least one category, the initial vote tally indicating an initial number of votes that have been recorded for a corresponding category; and the operations further comprise:
   determining a previous vote tally by accessing the preceding block; and
   adding the at least one vote to the previous vote tally to determine a new vote tally;

wherein the data structure further comprises the new vote tally.

3. The voting system of claim 1, wherein the data structure further comprises a time stamp.

4. The voting system of claim 1, wherein the at least one voting machine further comprises a printer, and the operations further comprises printing a receipt, the receipt recording the new block hash value.

5. The voting system of claim 1, wherein the voting system further comprises:
a plurality of voting machines; and at least one server comprising:
at least one server processor; and
at least one non-transitory server storage medium comprising server instructions that, when executed by the at least one server processor, cause the at least one server processor to perform server operations comprising:
initializing a master blockchain with a master genesis block; storing the master blockchain in at least one server memory; iteratively, for each of the plurality of voting machines:
receiving a block of a vote blockchain of a voting machine;
retrieving the master blockchain;
creating a master data structure comprising the received block and a hash value of a preceding block of the master blockchain;
determining a new master block hash value of the master data structure;
appending a new master block comprising the master data structure and the new master block hash value to the master blockchain; and
storing the master blockchain in the at least one server memory.

6. The voting system of claim 5, wherein the master genesis block comprises an initial total vote tally for the at least one category, the initial total vote tally indicating an initial total number of votes that have been recorded for the corresponding category; and the server operations further comprises:
determining a previous total vote tally by accessing the preceding block of the master blockchain; and
adding a voting machine vote tally to the previous total vote tally to determine a new total vote tally; wherein the master data structure further comprises the new total vote tally.

7. The voting system of claim 1, wherein the voting system further comprises:
at least one server comprising:
at least one server processor; and
at least one non-transitory server storage medium comprising server instructions that, when executed by the at least one server processor, cause the at least one server processor to perform server operations comprising:
receiving, from a user device, a query request comprising a query hash value;
determining a block of the blockchain comprising the query hash value;
retrieving a result data structure corresponding to the determined block; and
providing the result data structure to the user device.

8. The voting system of claim 1, wherein the voting system further comprises: at least one check-in terminal comprising at least one terminal processor; and
at least one non-transitory terminal storage medium comprising terminal instructions that, when executed by the at least one terminal processor, cause the at least one terminal processor to perform terminal operations comprising:
initializing a voter check-in blockchain with a voter check-in genesis block, the voter check-in genesis block comprising a check-in terminal identifier;
storing the voter check-in blockchain in at least one terminal memory;
iteratively, for the plurality of voters:
receiving an indication of an identifier of a voter;
accessing a data store comprising a list of registered voters;
creating a check-in data structure containing the identifier in response to the voter being among the list of registered voters;
determining a voter check-in hash value of the check-in data structure;
appending a new voter check-in block comprising the check-in data structure and the new voter check-in hash value to the voter check-in blockchain; and
storing the voter check-in blockchain in the at least one memory.

9. The voting system of claim 8, wherein the terminal operations further comprises:
accessing a master voter check-in blockchain on a server;
determining if the identifier of the voter is present in the master check-in blockchain; and
appending to the check-in data structure an indication that the voter has already voted.

10. The voting system of claim 8, wherein the identifier of the voter is a code provided on a paper ballot.

11. The voting system of claim 8, wherein the identifier is provided by the voter.

12. The voting system of claim 10, wherein:
the voting machine comprises a scanner;
the signal indicating selections made by a voter comprises a signal provided by the scanner upon scanning the paper ballot; and
the voting machine operations further comprise:
determining the code based on an image provided by the scanner; and appending the code to the data structure.

13. The voting system of claim 10, wherein the voting system further comprises:
at least one server comprising:
at least one server processor; and
at least one non-transitory server storage medium comprising server instructions that, when executed by the at least one server processor, cause the at least one server processor to perform server operations comprising:
receiving, from a user device, a query request comprising the code;
determining a block of the blockchain comprising the code;
retrieving a data structure corresponding to the determined block; and
providing the data structure to the user device.

14. The voting system of claim 1, wherein the at least one voting machine further comprises a printer, and the operations further comprise:
printing the new hash value on a paper ballot, the paper ballot being scanned to provide the signal indicating selections made by a voter.

15. The voting system of claim 1, wherein the blockchain is disseminated to a plurality of user devices.

16. The voting system of claim 15, wherein the blockchain is encrypted before dissemination.

17. The voting system of claim 1, further comprising:
a plurality of voting machines, wherein a set of the vote counting machines perform operations comprising:
  initializing a correction blockchain with a correction blockchain genesis block, the correction blockchain genesis block comprising a correction tally and a correction hash value;
  iteratively, for a plurality of correction votes:
    receiving a correction signal corresponding to a correction vote;
    creating a correction data structure comprising the corrected vote, the correction tally, and a hash corresponding to an incorrectly-counted vote;
    determining a correction block hash value of the correction data structure;
    appending a correction block comprising the correction data structure and the correction block hash value to the correction blockchain; and
    storing the correction blockchain in the at least one memory.

18. The voting system of claim 1, wherein the voting machine operations further comprises:
  calculating a first voting rate, the first voting rate representing a number of votes for one option of a category over a preceding first set of votes;
  calculating a second voting rate, the second voting rate representing a number of votes for one option of a category over a preceding second set of votes, the second set of votes comprising the first set of votes; and
  setting a hashing difficulty to be proportional to a difference between the first voting rate and the second voting rate, the hashing difficulty being a requirement that a first N characters of a new block hash value match a sequence.

19. The voting system of claim 18, wherein the hashing difficulty is further based on a check-in rate representing a number of voter check-ins during a preceding time period.

20. A computerized method of vote tallying comprising:
  initializing a vote blockchain with a vote blockchain genesis block, the vote blockchain genesis block comprising a voting machine identifier and a voting machine identifier hash value;
  storing the vote blockchain in at least one voting machine memory;
  iteratively, for a plurality of voters:
  receiving a signal indicating at least one vote made by a voter;
  creating a data structure comprising the at least one vote and a hash value of a preceding block;
  calculating a hash difficulty based on a vote trend and a voter check-in rate the vote trend representing a percentage of votes for a candidate of a plurality of candidates out of a number of preceding votes, the voter check-in rate representing a number of voters arriving during a time period, wherein the hash difficulty represents a number of characters of a hash value that match a predetermined sequence;
  determining a new block hash value of the data structure, the new block hash value beginning with the number of characters of the predetermined sequence determined by the hash difficulty;
  appending a new block comprising the data structure and the new block hash value to the vote blockchain;
  printing a receipt with the new block has value; and
  printing the new block hash value on a paper ballot scanned to provide the received signal.

\* \* \* \* \*

UNITED STATES PATENT AND TRADEMARK OFFICE
CERTIFICATE OF CORRECTION

PATENT NO. : 11,017,409 B1
APPLICATION NO. : 17/133519
DATED : May 25, 2021
INVENTOR(S) : Lloyd Page 1 of 2

It is certified that error appears in the above-identified patent and that said Letters Patent is hereby corrected as shown below:

In the Specification

Please replace Column 2 Line 31 with:
with the new block hash value; and printing the new block Please replace Column 12 Line 62 with:
machines, wherein a set of the voting machines Please replace Column 15 Line 41 with:
receipt with the new block hash value; and printing the new In the Claims Column 19 Lines 3-21 Claim 17 should read:
17. The voting system of claim 1, further comprising:
a plurality of voting machines, wherein a set of the voting machines perform operations comprising:
initializing a correction blockchain with a correction blockchain genesis block, the correction blockchain genesis block comprising a correction tally and a correction hash value;
iteratively, for a plurality of correction votes:
receiving a correction signal corresponding to a correction vote;
creating a correction data structure comprising the corrected vote, the correction tally, and a hash corresponding to an incorrectly-counted vote;
determining a correction block hash value of the correction data structure;
appending a correction block comprising the correction data structure and the correction block hash value to the correction blockchain; and
storing the correction blockchain in the at least one memory.

Please replace Column 19 Lines 4-5 with:
a plurality of voting machines, wherein a set of the
voting machines perform operations comprising:

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)

Column 20 Lines 4-33 Please replace Claim 20 with:
20. A computerized method of vote tallying comprising:
initializing a vote blockchain with a vote blockchain genesis block, the vote blockchain genesis block comprising a voting machine identifier and a voting machine identifier hash value;
storing the vote blockchain in at least one voting machine memory;
iteratively, for a plurality of voters:
receiving a signal indicating at least one vote made by a voter;
creating a data structure comprising the at least one vote and a hash value of a preceding block;
calculating a hash difficulty based on a vote trend and a voter check-in rate, the vote trend representing a percentage of votes for a candidate of a plurality of candidates out of a
number of preceding votes, the voter check-in rate representing a number of voters arriving during a time period,
wherein the hash difficulty represents a number of characters of a hash value that match a predetermined sequence;
determining a new block hash value of the data structure, the new block hash
value beginning with the number of characters of the predetermined sequence determined by the hash difficulty;
appending a new block comprising the data structure and the new block hash value to the vote blockchain;
printing a receipt with the new block hash value; and
printing the new block hash value on a paper ballot scanned to provide the received signal.

Please replace Column 20 Line 31 with:
printing a receipt with the new block hash rim value; and